United States Patent
Zhang et al.

(10) Patent No.: US 8,750,804 B2
(45) Date of Patent: Jun. 10, 2014

(54) APPLYING SPURIOUS INTERFERENCE REJECTION TO DETECT INCUMBENT USERS OF TELEVISION CHANNELS

(75) Inventors: Wenyi Zhang, San Diego, CA (US); Stephen J. Shellhammer, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 939 days.

(21) Appl. No.: 12/752,527

(22) Filed: Apr. 1, 2010

(65) Prior Publication Data

US 2010/0302459 A1 Dec. 2, 2010

Related U.S. Application Data

(60) Provisional application No. 61/182,743, filed on May 31, 2009.

(51) Int. Cl.
*H04B 1/00* (2006.01)
*H04B 15/00* (2006.01)

(52) U.S. Cl.
USPC ........................ 455/63.1; 455/67.11

(58) Field of Classification Search
USPC .............................. 455/63.1, 67.11
See application file for complete search history.

(56) References Cited

U.S. PATENT DOCUMENTS

2008/0112467 A1* 5/2008 Shellhammer ............. 375/143
2008/0198948 A1* 8/2008 Tang ........................... 375/316

FOREIGN PATENT DOCUMENTS

| EP | 1415403 A2 | 5/2004 |
| GB | 2447148 | 9/2008 |
| TW | 200723803 | 6/2007 |
| TW | 200806024 A | 1/2008 |
| WO | WO-2006039800 A1 | 4/2006 |

OTHER PUBLICATIONS

International Search Report and Written Opinion—PCT/US2010/036410, International Search Authority—European Patent Office—Nov. 24, 2010.
Shellhammer, S.J.: "Spectrum sensing in IEEE802.22" First Workshop on Cognitive Info. Process. (CIP 2008) Jun. 9, 2008, XP002557132 Retrieved from the Internet: URL:http://www.eurasip.org/Proceedings/Ext/CIP2008/papers/1569094657.pdf> [retrieved on Nov. 23, 2009] paragraphs [06.4]-[06.6].
Taiwan Search Report—TW099117261—TIPO—Oct. 1, 2013.

* cited by examiner

*Primary Examiner* — Lewis West
(74) *Attorney, Agent, or Firm* — Stanton Braden

(57) ABSTRACT

The use of white space devices in unused portions of the television channel spectrum is facilitated by spectrum sensing techniques that combine interference rejection techniques with feature extraction techniques to detect presence or absence of incumbent users in the spectrum.

21 Claims, 6 Drawing Sheets

APPLYING SPURIOUS INTERFERENCE REJECTION TO DETECT INCUMBENT USERS OF TELEVISION CHANNELS

CLAIM OF PRIORITY UNDER 35 U.S.C. §119

The present application for patent claims priority to Provisional Application No. 61/182,743 entitled "Sensing Wireless Microphone Spectrum with Spurious Interference Rejection" filed May 31, 2009, and assigned to the assignee hereof and hereby expressly incorporated by reference herein.

BACKGROUND

1. Field

The present work relates generally to the wireless communications and, more particularly, to detecting the presence/absence of incumbent signals in television (TV) channels.

2. Background

The Federal Communications Commissions (FCC) is developing rules to allow low-power white space devices (WSD) to use unoccupied TV channels, referred to as TV white space, provided that WSDs do not cause harmful interference to TV receivers. Cognitive radio thus demands a technology that can periodically sense the radio frequency (RF) environment, dynamically identify unused spectral segments, and then operate in these white spaces without causing harmful interference to the incumbent users. As one of the essential functionalities of a WSD, spectrum sensing needs to reliably detect weak incumbent signals at very low signal-to-noise ratio (SNR). Incumbents include ATSC and NTSC TV broadcasts and Part 74 wireless microphones.

There are several prior art detection techniques for spectrum sensing. Some of the known detection techniques focus on extracting features from the power spectral density (PSD) estimate. If an incumbent signal exists at a certain frequency, the PSD estimate exhibits a value noticeably higher than the noise floor. Therefore from comparing the PSD estimate with known patterns associated with incumbent signals, the existence or absence of incumbent signals can be detected.

However, in a realistic receiver, even without an incumbent signal, there exist residual signals from adjacent channels, internal emissions, interference from unknown sources, RF impairments such as harmonic images and intermodulation distortions due to hardware constraints. In the PSD estimate, these non-ideal effects introduce spikes that are easily detected, and may then be improperly identified as incumbent signals, leading to false alarms. Unless these spurious spikes are identified as such, almost all the white spaces will be classified as occupied, thus largely preventing the desired operation of WSDs. FIG. 1 illustrates the PSD estimate of a typical white space TV channel in the absence of incumbent signaling.

The problem of improperly classifying spurious spikes as real incumbent signals becomes especially challenging for wireless microphone sensing. Part 74 wireless microphone signals are typically frequency modulated (FM) with a bandwidth no greater than 200 kHz, and their carrier frequencies can choose from a large number of possible locations within a TV channel. Furthermore, their features like tone keys are weakened when the signal is modulated by voice or music, and are completely eliminated by noise at low SNR. The wireless microphone signals therefore become essentially indistinguishable from spurious spikes in the TV channel spectrum.

It is desirable in view of the foregoing to provide for rejection of spurious interference in the detection of incumbent TV channel users, for example, wireless microphone users.

SUMMARY

The use of white space devices in unused portions of the TV channel spectrum is facilitated using novel techniques to detect presence or absence of incumbent users of the spectrum. Examples of these techniques include incorporating a noise floor into a PSD estimate associated with a sampled baseband signal, and processing a sampled baseband signal to produce an associated phase PSD for use in the incumbent user detection.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work. The word "exemplary" is used herein to mean "serving as an example, instance, or illustration." Any embodiment described herein as "exemplary" is not necessarily to be construed as preferred or advantageous over other embodiments.

Exemplary embodiments of the present work detect the existence or absence of incumbent signals in the TV channel spectrum. For example, such incumbent signals may be Part 74 wireless microphone signals. In order to minimize false alarms due to spurious spikes in the spectrum, some embodiments of the present work employ the following techniques:

(1) Perform a screening check for candidate PSD spikes. In this procedure, those spikes with no wireless microphone signal features are discarded.

(2) In searching for candidate PSD spikes, add a controlled amount of additional white noise in order to suppress spurious spikes.

(3) For each candidate PSD spike after screening, convert the spike signal into narrowband baseband, and check the PSD estimate of its phase sequence, which provides additional features for FM wireless microphone signals.

Detailed examples of these techniques are described below, using for expository purposes the aforementioned example of Part 74 wireless microphone signals.

Figure 1:
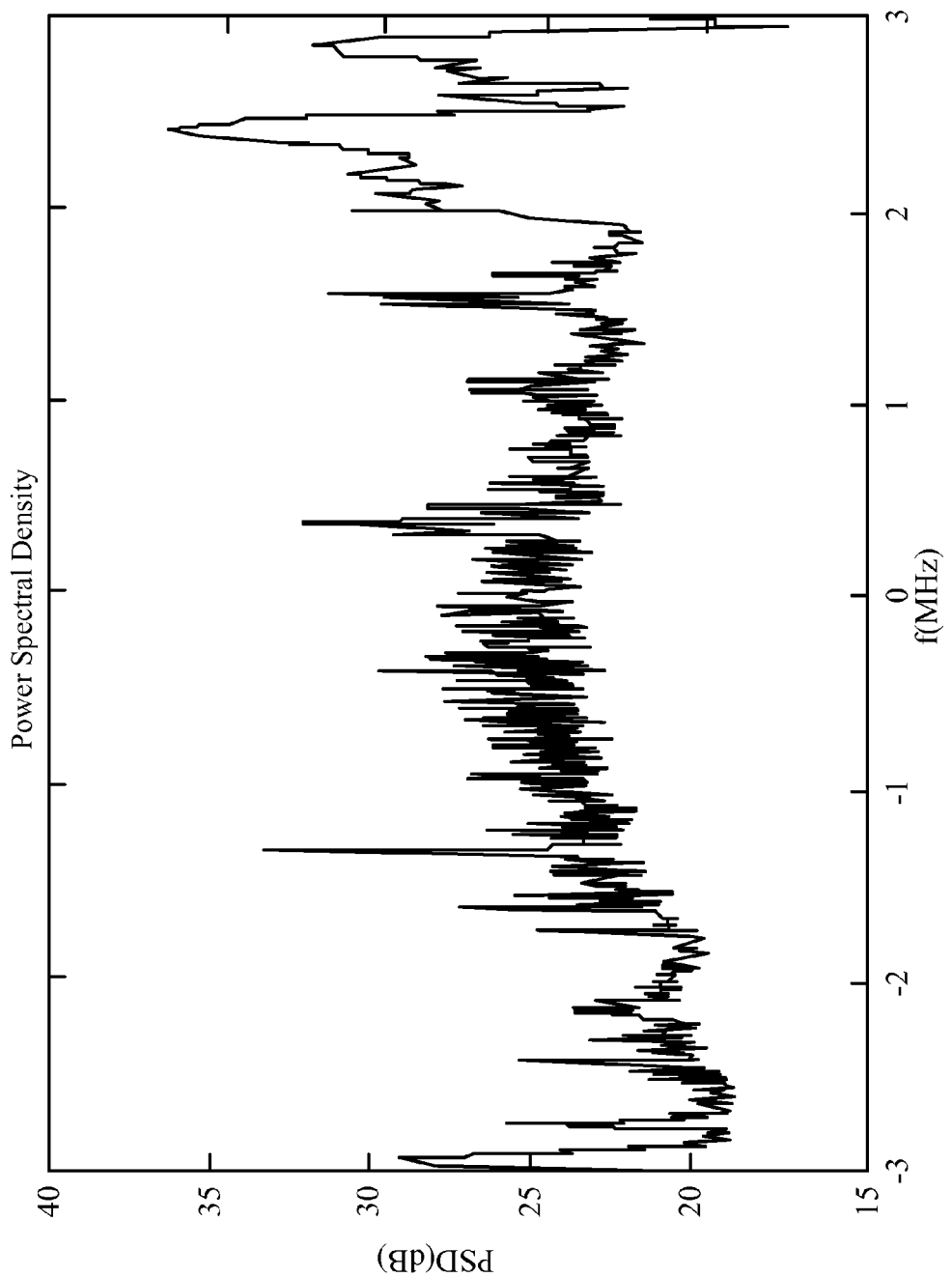
FIG. 1 graphically illustrates an estimated power spectral density (PSD) of a typical white space TV channel with no incumbent signal present.
Figure 2:
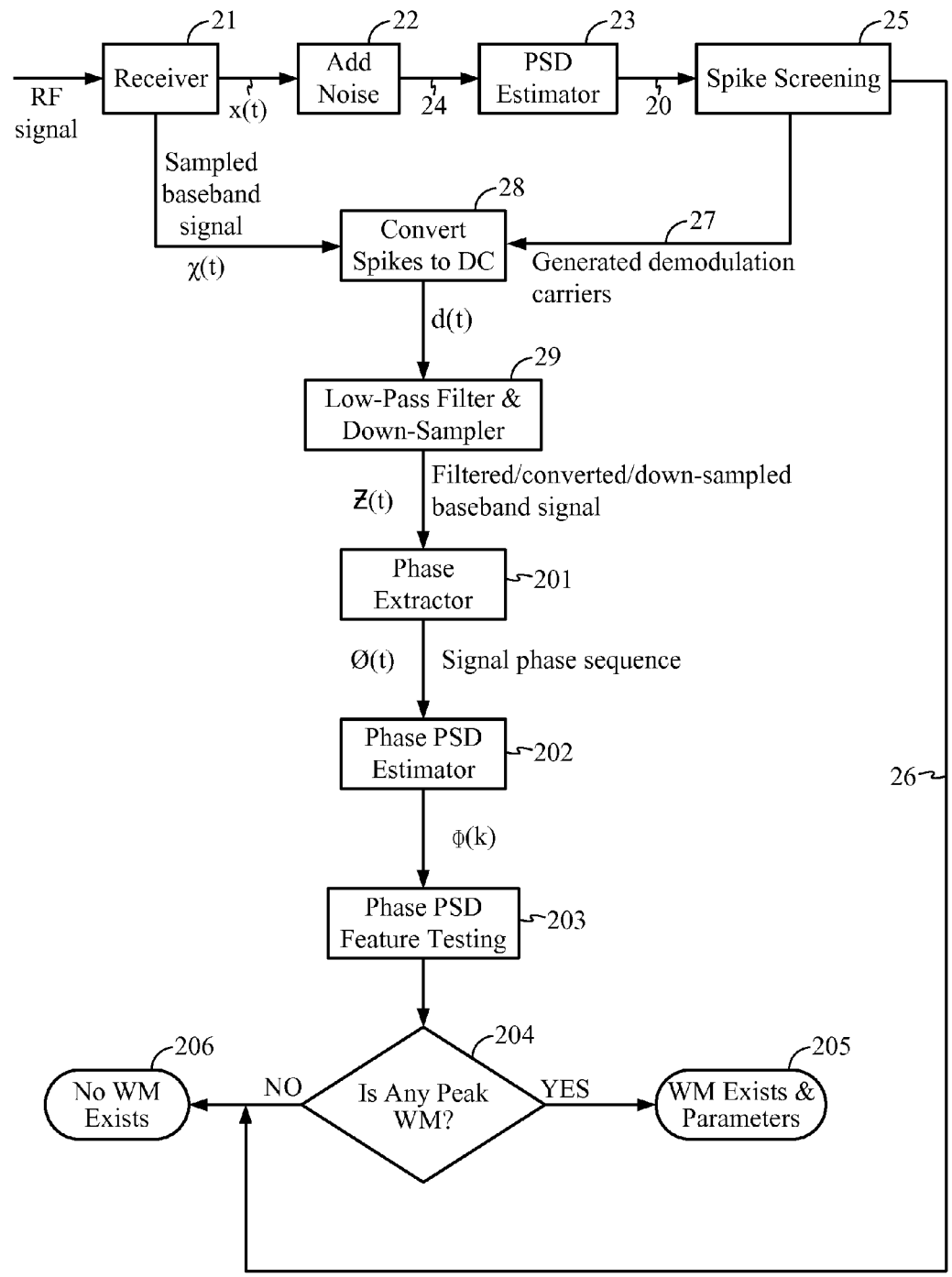
FIG. 2 diagrammatically illustrates method and apparatus capable of detecting presence/absence of incumbent signals in white space TV channels according to exemplary embodiments of the present work.

FIG. 2 diagrammatically illustrates a method and apparatus according to exemplary embodiments of the present work. In some embodiments, the "Receiver" 21 is a conventional receiving device, which takes as input the RF signal, down-converts it to baseband, filters out the images, and samples the baseband signal to discrete-time form. Let x(t) be the sampled baseband signal sequence, for t=1, . . . , N. In some embodiments, the sampled baseband signal x(t) corresponds to the TV channel to be sensed, with 6 MHz bandwidth, sampled at the Nyquist rate of 6M samples/second.

Figure 3A:
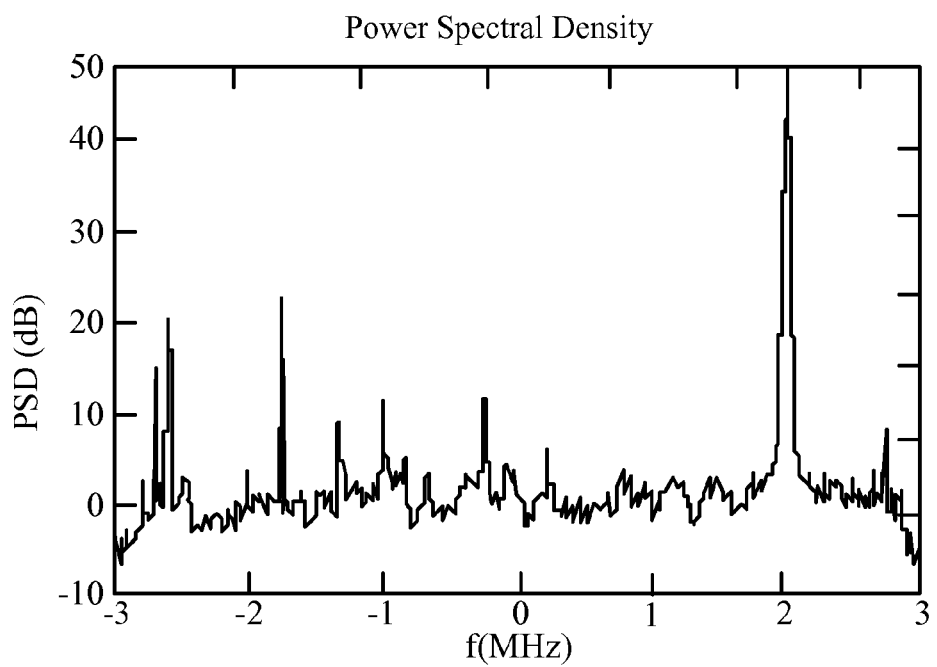
FIGS. 3A and 3B graphically illustrate how adding noise according to exemplary embodiments of the present work affects the power spectral density of a white space TV channel with an incumbent signal present.
Figure 3B:
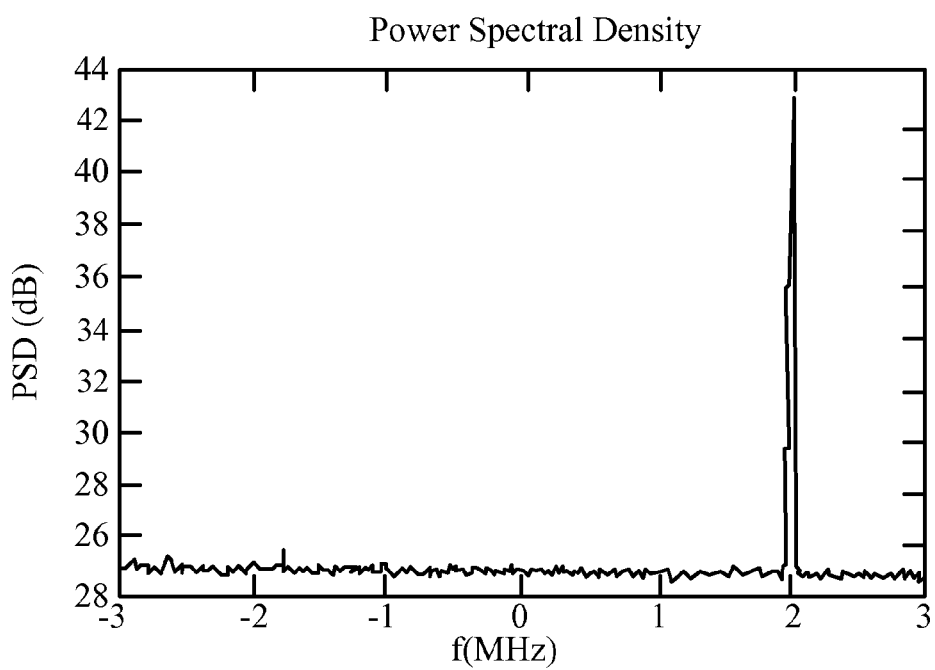

An "Add Noise" unit 22 first scales the signal x(t) to unit power, and adds additional noise. In some embodiments, the amount of added noise is controlled such that (1) the wireless microphone signal feature will not be concealed in the subsequent PSD estimator 23, for SNR as low as −20 dB; and (2) the increased noise floor will flatten out as many spurious spikes as possible. FIG. 3A and FIG. 3B respectively illustrate examples of signal PSDs. FIG. 3A illustrates an example of the estimated PSD that would be produced by PSD estimator 23 without adding noise at 22, and FIG. 3B illustrates an example of the estimated PSD produced by PSD estimator 23 with noise added at 22. As shown in FIG. 3A and FIG. 3B, the wireless microphone feature at 2 MHz in FIG. 3A is not affected in FIG. 3B by the added noise, whereas most of the spurious spikes in FIG. 3A are eliminated in FIG. 3B due to the added noise. In some embodiments, the noise addition is mathematically modeled as $$x(t) \leftarrow \sqrt{snr}\,x(t) + w(t)$$

where x(t) has been scaled to unit power before noise addition, w(t) is unit-power white noise, and snr controls the relative amount of added noise. In some embodiments, snr=−5 dB.

Some embodiments use an alternative to the "Add Noise" unit 22, by simply modifying the PSD estimate to give the same effect as the unit 22. If S(k) is a PSD estimate such as described above relative to FIG. 3A, the modified PSD estimate can be given by S'(k)=max(S(k),S$_0$), where S$_0$ is selected to set a noise floor value below which the PSD will not go. This modification (not explicitly shown in FIG. 2) is implemented at the output of the PSD Estimator 23, to produce at 20 a PSD estimate that incorporates the desired noise floor without use of the Add Noise unit 22.

A "PSD Estimator" 23 estimates the PSD of the signal 24 output from the Add Noise unit 22. In some embodiments, the PSD estimation operation is designed to yield a relatively smooth PSD estimate. One known PSD estimation procedure divides the entire data block into multiple intervals, computes the periodogram for each interval, and averages the multiple periodograms. In the following discussion, S(k) is a PSD estimate such as described above with respect to FIG. 3B and designated at 20 in FIG. 2, for k=1, . . . , L where L is the FFT size used in the PSD estimation.

In some embodiments, Welch's method (with a standard Hamming window and an overlapping factor 0.5) is employed at 23 to produce the PSD estimate 20, with FFT size of 1024.

As described below, the portion of FIG. 2 shown collectively at 25-29 and 201-206 constitutes a detection unit that uses the PSD estimate 20 to determine whether incumbent TV channel users are active. A "Spike Screening" unit 25 performs initial checks to discard spurious spikes that are not possibly due to a wireless microphone. In some embodiments, the checks account for the following:

(1) A wireless microphone spike should have a peak-to-average ratio (PAR) in the PSD estimate of at least 5 dB, for SNR above −20 dB. The PAR is computed as $$PAR = \frac{\max_{k=1,\ldots,L} S(k)}{(1/L)\sum_{k=1}^{L} S(k)};$$

(2) A wireless microphone spike should have a bandwidth no smaller than 10 kHz, and no larger than 200 kHz. A spike is defined as a contagious segment of $\{S(k)\}_{k=l}^{u}$, such that, $$S(k) \geq (1/L)\sum_{n=1}^{L} S(n) + 3 \text{ dB},$$

for L≤k≤u; and

S(k) is otherwise, for k=l−1 and u+1.

The bandwidth of a spike thus is obtained by converting the number of bins of a spike to frequency. For a 6 MHz TV channel example, the bandwidth is calculated by $$\frac{u-l+1}{L} \cdot 6 \text{ MHz}.$$

The screening unit 25 retains candidate spikes and identifies them in a list 27 of frequency locations [p$_1$, p$_2$, . . . , p$_M$], each of which indicates the peak location of a candidate spike. If the list 27 is empty, the apparatus declares that no wireless microphone signals are present (see 26 and 206 in FIG. 2).

The "Convert Spikes to DC" unit 28 and all subsequent processing blocks process (serially or in parallel in various embodiments) all the candidate PSD spikes identified in list 27, in order to determine whether any of the candidate spikes are due to wireless microphones. For each candidate spike, the unit 28 further demodulates the signal, such that the peak of the spike is converted to DC. For peak frequency location p$_m$ MHz(−3≤p$_m$≤+3 for 6 MHz TV channel, m=1, 2, . . . M), a complex-exponential carrier of frequency −p$_m$ MHz is generated to demodulate x(t):

$$d(t)=x(t)\cdot\exp[-j2\pi p_m t].$$

The "Low-Pass Filter & Down-Sampler" unit 29 first passes the converted signal d(t) through a low-pass filter (LPF), in order to eliminate the signal components far away from the spike under examination. In some embodiments, the LPF has a linear phase response, in order not to distort the phase of the filtered signal. A down-sampler is employed to down-sample the filtered signal sequence to the Nyquist rate. Let z(t) be the signal output from unit 29. In some embodiments, the LPF bandwidth is 300 kHz (leading to a down-sampling factor of 20 for 6 MHz TV channel), and a 64-tap FIR filter with linear phase is used, which may be generated, for example, by MATLAB code fir1 (64, 1/20).

As described above, the portion of FIG. 2 shown collectively at 22-25, 28 and 29 constitutes a signal processing unit that processes the sampled baseband signal x(t) to produce a set of suitably processed signal samples z(t). A "Phase Extractor" 201 computes the phase for each complex-valued signal sample of z(t). The phase can be computed as $$\phi(t) = \arctan\frac{\text{Im} z(t)}{\text{Re} z(t)}.$$

In some embodiments, MATLAB "atan" function is employed for this computation. Some embodiments use a table-lookup for higher processing speed.

Figure 4:
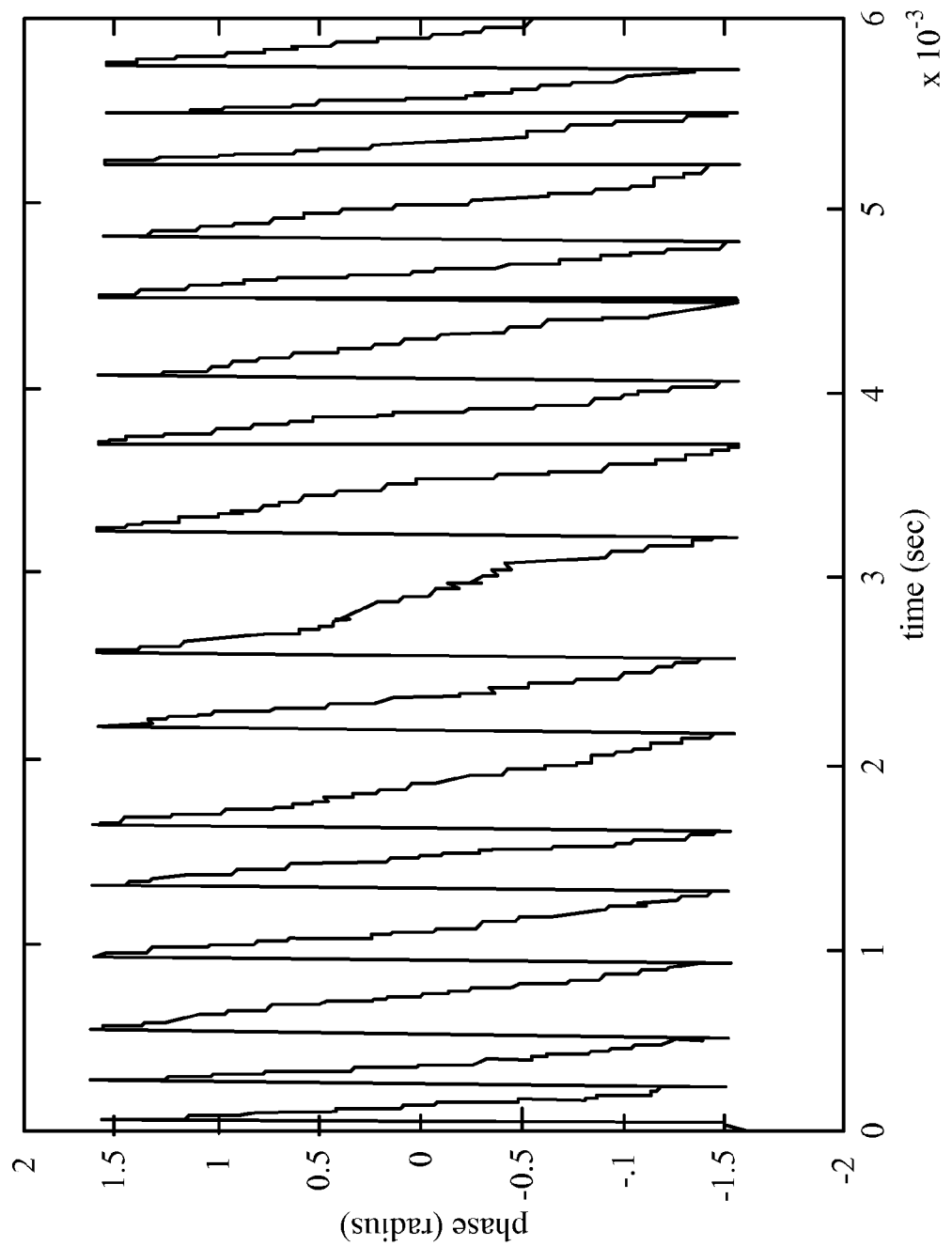
FIG. 4 graphically illustrates an example of a phase sequence associated with a wireless microphone signal.
Figure 5A:
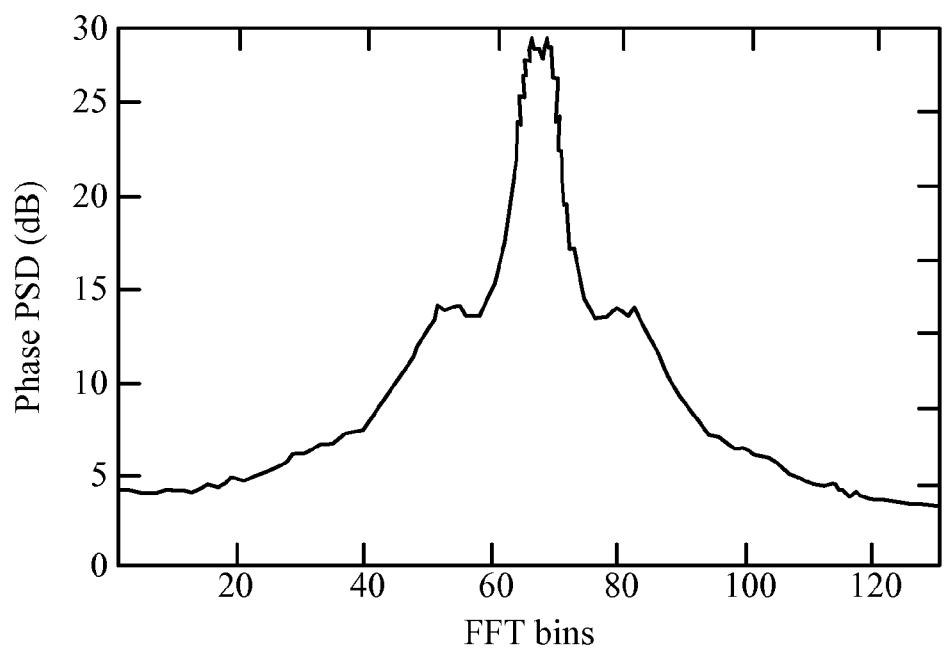
FIGS. 5A and 5B graphically illustrate estimates of a phase PSD associated with a wireless microphone during silence and music, respectively, according to exemplary embodiments of the present work.
Figure 5B:
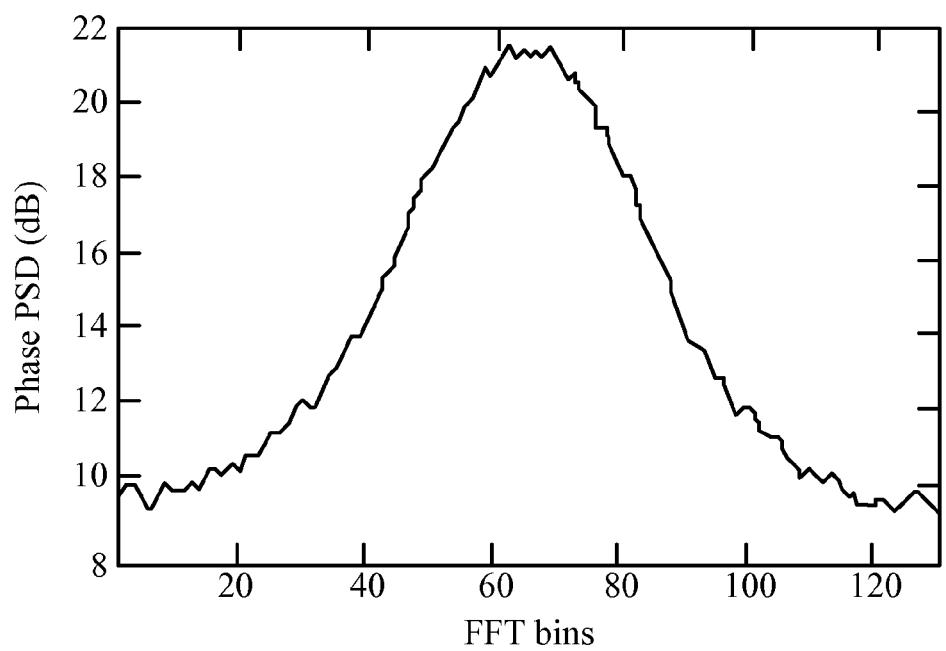

The "Phase PSD Estimator" 202 estimates the PSD of the phase sequence $\phi(t)$. FIG. 4 illustrates an example of the phase sequence of a wireless microphone signal. Various PSD estimation algorithms may be employed to obtain a relatively smooth PSD estimate. Let $\Phi(k)$ be the estimated phase PSD, for $k=1, \ldots, L_{101}$ where $L_{101}$, is the FFT size used in the PSD estimation. In some embodiments, Welch's method (with a standard Hamming window and an overlapping factor 0.5) is employed, with FFT size of 128. FIG. 5A and FIG. 5B illustrate examples of the estimated phase PSD of wireless microphone signals associated with silence (FIG. 5A) and music (FIG. 5B).

Figure 6:
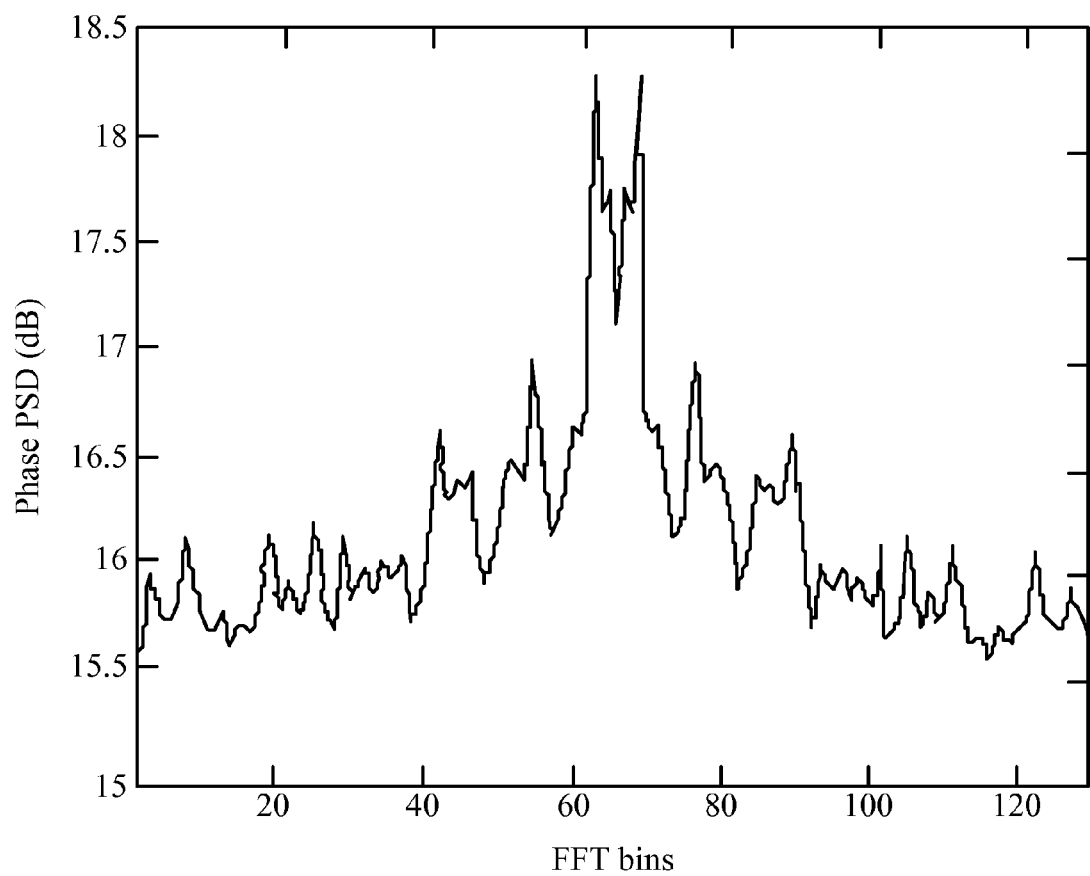
FIG. 6 graphically illustrates an estimate of a phase PSD of a typical spurious signal according to exemplary embodiments of the present work.

The "Phase PSD Feature Testing" unit 203 performs further checks to discard spurious spikes. If the conversion at 28 perfectly converts the spike peak to DC, then except for FM signals which have temporally slow phase variation, other spurious signals with white phase sequences should not exhibit any peak around the center of the phase PSD estimate $\Phi(k)$. However, in implementation, due to the finite FFT bin size, even if a spike has a white phase sequence, the converted signal d(t) produced at 28 may still contain periodic slow slopes which lead to noticeable DC components in the phase PSD estimate $\Phi(k)$. FIG. 6 illustrates a typical phase PSD estimate for a spurious spike. In some embodiments, the following checks are used at 203 to discard spurious spikes.

(1) The peak of the phase PSD should not deviate from the center by more than 5%. The peak location is $$pl = \underset{k=1,\ldots,L_\Phi}{\arg\max} \Phi(k),$$

and its deviation from the center is $$dev = \frac{(l-1)}{L_\Phi} - 0.5.$$

where l is the parameter used above to define spikes (2) The center peak of the phase PSD either has a PAR higher than 25 dB and a relative width larger than 20%, or has a PAR at least 3 dB and a relative width larger than 3%. The PAR is computed as $$PAR_\Phi = \frac{\underset{k=1,\ldots,L_\Phi}{\max} \Phi(k)}{(1/L_\Phi)\sum_{k=1}^{L_\Phi} \Phi(k)}.$$

To compute the relative width, some embodiments define the center width as the number of bins in a contagious segment of bins that contains the center bin, $L_\Phi/2$, and where all phase PSD values within the continuous segment of bins exceed $$(1/L_\Phi)\sum_{k=1}^{L_\Phi} \Phi(k).$$

If B is the number of bins in the continuous segment, then the relative width is $$\frac{B}{2L_\Phi}.$$

In summary, the checks performed at 203 are as follows:

$$|dev| \leq 0.05, \tag{1}$$

and $$\begin{cases} PAR_\Phi \geq 25 \text{ dB AND } \dfrac{B}{2L_\Phi} \geq 0.2 \\ \text{OR, } PAR_\Phi \geq 3 \text{ dB AND } \dfrac{B}{2L_\Phi} \geq 0.03. \end{cases} \tag{2}$$

If any of the candidate spikes is detected at 204 (from the checks at 203) to be due to a wireless microphone (WM) signal, then the associated frequency location and phase PSD center peak parameters are noted at 205. Otherwise, it is noted at 206 that no wireless microphone signals are present in the targeted TV channel spectrum. Thus, the portion of FIG. 2 shown generally at 203-206 collectively constitutes a detection unit that uses the phase PSD estimate $\Phi(k)$ to determine whether incumbent TV channel users are active Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method of analyzing a portion of a radio frequency (RF) spectrum, comprising:
   using an RF receiver to convert an RF input signal to a sampled baseband signal;
   establishing a noise floor for power spectral density estimation; producing for the sampled baseband signal an associated power spectral density estimate that incorporates the noise floor; and
   using the power spectral density estimate to determine whether an RF channel user is active in the portion of the RF spectrum; wherein said using includes screening the estimated power spectral density to discard spurious spikes and produce a screened signal containing only candidate spikes.

2. The method of claim 1, wherein said using includes demodulating the screened signal to produce a converted signal having respective peaks of the candidate spikes converted to DC.

3. The method of claim 2, wherein said using includes filtering the converted signal to produce a filtered signal, and down-sampling the filtered signal to produce a set of down-converted signal samples.

4. The method of claim 3, wherein said using includes determining from the set of down-converted signal samples a set of respectively corresponding phase values.

5. The method of claim 4, wherein said using includes estimating a further power spectral density for the set of phase values.

6. The method of claim 5, wherein said using includes using the further estimated power spectral density to determine whether an RF channel user is active in the portion of the RF spectrum.

7. The method of claim 1, wherein said providing includes adding noise to the sampled baseband signal to produce a modified sampled baseband signal, and wherein said producing includes using the modified sampled baseband signal to produce the power spectral density estimate.

8. The method of claim 1, wherein the portion of the RF spectrum is a television channel spectrum and the RF channel user is a wireless microphone user.

9. An apparatus for analyzing a portion of a radio frequency (RF) spectrum, comprising:
   an RF receiver for converting an RF input signal to a sampled baseband signal;
   a noise floor unit for establishing a noise floor for power spectral density estimation;
   a power spectral density estimator coupled to said receiver and said noise floor unit, said power spectral density estimator cooperable with said receiver and said noise floor unit to produce for the sampled baseband signal an associated power spectral density estimate that incorporates the noise floor; and
   a detection unit coupled to said power spectral density unit and configured for using the power spectral density estimate to determine whether an RF channel user is active in the portion of the RF spectrum; wherein said detection unit is configured to screen the estimated power spectral density to discard spurious spikes and produce a screened signal containing only candidate spikes.

10. The apparatus of claim 9, wherein said detection unit is configured to demodulate the screened signal to produce a converted signal having respective peaks of the candidate spikes converted to DC.

11. The apparatus of claim 10, wherein said detection unit is configured to determine from the set of down-converted signal samples a set of respectively corresponding phase values.

12. The apparatus of claim 11, wherein said detection unit is configured to determine from the set of down-converted signal samples a set of respectively corresponding phase values.

13. The apparatus of claim 12, wherein said detection unit is configured to estimate a further power spectral density for the set of phase values.

14. The apparatus of claim 13, wherein said detection unit is configured to use the further estimated power spectral density to determine whether an RF channel user is active in the portion of the RF spectrum.

15. The apparatus of claim 9, wherein said noise floor unit is coupled to said receiver for adding noise to the sampled baseband signal to produce a modified sampled baseband signal, and wherein said power spectral density estimator is configured to use the modified sampled baseband signal to produce the power spectral density estimate.

16. An apparatus for analyzing a portion of a radio frequency (RF) spectrum, comprising:
   means for converting an RF input signal to a sampled baseband signal;
   means for establishing a noise floor for power spectral density estimation;
   means for producing for the sampled baseband signal an associated power spectral density estimate that incorporates the noise floor; and means for using the power spectral density estimate to determine whether an RF channel user is active in the portion of the RF spectrum; wherein said means for converting an RF input signal to a sampled baseband signal includes screening the estimated power spectral density to discard spurious spikes and produce a screened signal containing only candidate spikes.

17. A computer program product for supporting analysis of a portion of a radio frequency (RF) spectrum, comprising:
a non-transitory computer-readable medium having stored thereon;
code for causing at least one data processor to receive a sampled baseband signal corresponding to an RF input signal;
code for causing the at least one data processor to establish a noise floor for power spectral density estimation;
code for causing the at least one data processor to produce for the sampled baseband signal an associated power spectral density estimate that incorporates the noise floor; and
code for causing the at least one data processor to use the power spectral density estimate to determine whether an RF channel user is active in the portion of the RF spectrum; wherein said code for causing at least one data processor to receive a sampled baseband signal includes screening the estimated power spectral density to discard spurious spikes and produce a screened signal containing only candidate spikes.

18. A method of analyzing a portion of a radio frequency (RF) spectrum, comprising:
converting an RF input signal to a sampled baseband signal;
processing the sampled baseband signal to produce a set of complex-value signal samples;
determining from the set of complex-value signal samples a set of respectively corresponding phase values;
estimating a power spectral density for the set of phase values; and
using the estimated power spectral density to determine whether an RF channel user is active in the portion of the RF spectrum; and wherein said processing includes producing for the sampled baseband signal an associated power spectral density estimate to discard spurious spikes and produce a screened signal containing only candidate spikes.

19. An apparatus for analyzing a portion of a radio frequency (RF) spectrum, comprising:
an RF receiver for converting an RF input signal to a sampled baseband signal;
a signal processing unit coupled to said RF receiver and configured to process the sampled baseband signal to produce a set of complex-value signal samples;
a phase extractor coupled to said signal processing unit for determining from the set of complex-value signal samples a set of respectively corresponding phase values;
a power spectral density estimator coupled to said phase extractor for estimating a power spectral density for the set of phase values; and
a detection unit coupled to said power spectral density estimator and configured for using said estimated power spectral density to determine whether an RF channel user is active in the portion of the RF spectrum; and wherein said signal processing unit includes a further power spectral density estimator configured to produce for the sampled baseband signal an associated power spectral density estimate to discard spurious spikes and produce a screened signal containing only candidate spikes.

20. An apparatus for analyzing a portion of a radio frequency (RF) spectrum, comprising:
means for converting an RF input signal to a sampled baseband signal;
means for processing the sampled baseband signal to produce a set of complex-value signal samples;
means for determining from the set of complex-value signal samples a set of respectively corresponding phase values;
means for estimating a power spectral density for the set of phase values; and
means for using the estimated power spectral density to determine whether an RF channel user is active in the portion of the RF spectrum.

21. A computer program product for supporting analysis of a portion of a radio frequency (RF) spectrum, comprising:
a non-transitory computer-readable medium having stored thereon:
code for causing at least one data processor to receive a sampled baseband signal corresponding to an RF input signal;
code for causing the at least one data processor to process the sampled baseband signal to produce a set of complex-value signal samples;
code for causing the at least one data processor to determine from the set of complex-value signal samples a set of respectively corresponding phase values;
code for causing the at least one data processor to estimate a power spectral density for the set of phase values; and
code for causing the at least one data processor to use the estimated power spectral density to determine whether an RF channel user is active in the portion of the RF spectrum.

* * * * *